(12) United States Patent
Shaw et al.

(10) Patent No.: US 9,798,453 B2
(45) Date of Patent: Oct. 24, 2017

(54) BEAK RIBBON SYSTEM

(71) Applicant: Microsoft Technology Licensing, LLC, Redmond, WA (US)

(72) Inventors: Han-Yi Shaw, Redmond, WA (US); Derek Snook, Redmond, WA (US); Anand Rajeswaran, Seattle, WA (US); Allen Ussher, Seattle, WA (US); Mark A. Vitale, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 493 days.

(21) Appl. No.: 14/217,176

(22) Filed: Mar. 17, 2014

(65) Prior Publication Data
US 2015/0261417 A1    Sep. 17, 2015

(51) Int. Cl.
G06F 3/048 (2013.01)
G06F 3/0484 (2013.01)
G06F 3/0483 (2013.01)
G06F 3/0482 (2013.01)

(52) U.S. Cl.
CPC ........ *G06F 3/04842* (2013.01); *G06F 3/0482* (2013.01); *G06F 3/0483* (2013.01)

(58) Field of Classification Search
CPC .. G06F 3/0482; G06F 3/0481; G06F 3/04842; G06F 3/04817; G06F 3/0488; G06F 3/0483
See application file for complete search history.

(56) References Cited

U.S. PATENT DOCUMENTS

| | | | | |
|---|---|---|---|---|
| 6,121,965 A | * | 9/2000 | Kenney | G06F 3/0482 715/810 |
| 6,621,532 B1 | * | 9/2003 | Mandt | G06F 3/0482 348/841 |
| 8,347,226 B2 | * | 1/2013 | Windl | G06F 3/0482 715/810 |

(Continued)

FOREIGN PATENT DOCUMENTS

EP    976023 A1    2/2000

OTHER PUBLICATIONS

Robertson et al, Explorations in Task Management on the Desktop, © 2007; IEEE; pp. 101-138.*

(Continued)

*Primary Examiner* — Linh K Pham
(74) *Attorney, Agent, or Firm* — Perkins Coie LLP (57) ABSTRACT

A beak ribbon system provides a beak-based ribbon user interface with a gliding beak, shifting commands, and an expanding and collapsing beak box. When a user selects a first name of first commands, the beak ribbon system then displays a beak box that has a beak pointing to the first name and that contains the first commands. Upon receiving a selection of a second name of second commands, the beak ribbon system glides the beak in an animated manner from pointing to the first name to pointing to the second name and replaces the first commands in the beak box with the second commands. The beak ribbon system may also shift the second commands in an animated manner from the first identification towards the second identification. The beak ribbon system may also expand and collapse the beak box in an animated manner.

22 Claims, 9 Drawing Sheets

(56) References Cited

U.S. PATENT DOCUMENTS

| | | | |
|---|---|---|---|
| 8,614,665 B2* | 12/2013 | Li | G06F 3/04812 345/156 |
| 8,743,151 B1* | 6/2014 | Fulcher | G06Q 10/107 345/684 |
| 2006/0036964 A1* | 2/2006 | Satterfield | G06F 3/0481 715/777 |
| 2007/0028269 A1* | 2/2007 | Nezu | G11B 19/025 725/52 |
| 2009/0019401 A1* | 1/2009 | Park | G06F 3/04883 715/841 |
| 2009/0313580 A1* | 12/2009 | Nakata | A63F 13/00 715/810 |
| 2011/0066979 A1* | 3/2011 | Matsui | A61B 1/00045 715/823 |
| 2012/0066647 A1* | 3/2012 | Ullmann | G06F 3/0481 715/841 |
| 2012/0159375 A1 | 6/2012 | Shaw et al. | |
| 2013/0125041 A1* | 5/2013 | Doan | G06F 9/4443 715/781 |
| 2013/0125052 A1* | 5/2013 | Baird | G06F 3/0482 715/810 |
| 2013/0318466 A1* | 11/2013 | Estrada | G06F 3/0482 715/777 |
| 2014/0258016 A1* | 9/2014 | Hale | G06Q 30/08 705/26.3 |
| 2015/0082224 A1* | 3/2015 | Hathaway | G06F 9/44 715/771 |

OTHER PUBLICATIONS

International Search Report and Written Opinion Issued in PCT Application No. PCT/US2015/019003, dated Jul. 23, 2015, 14 Pages.

"Kingsoft Office Free 2013", Published on: Jun. 9, 2013, Available at: http://www.ksosoft.com/product/spreadsheets-free.html.

Smith, Matt, "Office 2010—Is It Any Better Than Office 2007?", Published on: Nov. 23, 2010, Available at: http://www.makeuseof.com/tag/office-2010-office-2007/.

"Android Office User Manual—Kingsoft Office", Published on: May 10, 2012, Available at: http://www.kingsoftstore.com/download/android-user-manual-9.pdf.

\* cited by examiner

BEAK RIBBON SYSTEM

BACKGROUND

User interfaces for many types of application programs have employed a menu model for accessing functions of the application programs. A menu model provides a menu hierarchy that consists of highest-level menus with each menu having menu items. Each menu item can itself be a sub-menu or can be a command. To allow access to its functions, an application program displays the names of the highest-level menus. When a user selects a menu, the application program displays the menu items of the selected menu. When a user selects a menu item that is a sub-menu, the application program displays the menu items of the selected sub-menu. When a user selects a menu item that is a command, the application program performs the function associated with that command. For example, a menu named "file" may have menu items of "open," "close," "print," and so on. The "open" menu item may be a sub-menu with the menu items of "open read-only," "open and print," and "open and send."

An alternative to a user interface that provides a menu hierarchy for accessing the commands of an application program is a user interface that provides a ribbon. To provide a ribbon, an application program divides its commands into sets of commands and further into subsets of commands. A ribbon is typically displayed using a tab model that displays the name of each set of commands horizontally across the display. When a user selects a set of commands by selecting its name, the application program highlights (e.g., with underlining or bolding) the name and displays a tab box with an outline of a tab around the name. The application program also displays the subsets of commands for the selected set of commands within the box. The commands are generally represented by displaying selectable icons, buttons, tools, text, and so on that are suggestive of their functions. For example, if the name of a set of commands is "insert," then the commands within the tab box may be icons representing an equation, an image, a video, and so on for inserting the corresponding item into a document opened by the application program. When a user then selects a different set of commands, the application program highlights the name of the set of commands and modifies the tab box to have an outline of a tab around the highlighted name. The application program also replaces the subsets of commands that are displayed within the tab box with those associated with the selected name.

Figure 1:
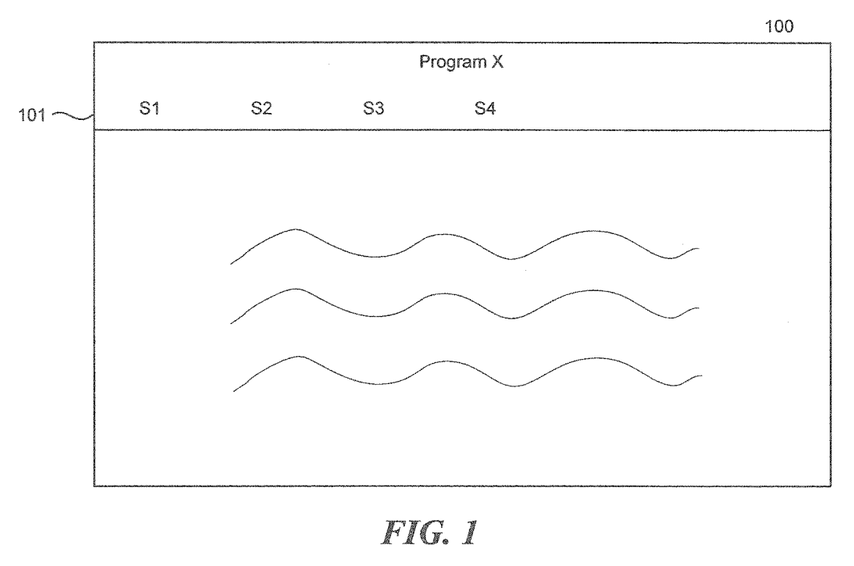
FIG. 1 is a display page that illustrates a portion of a ribbon.
Figure 2:
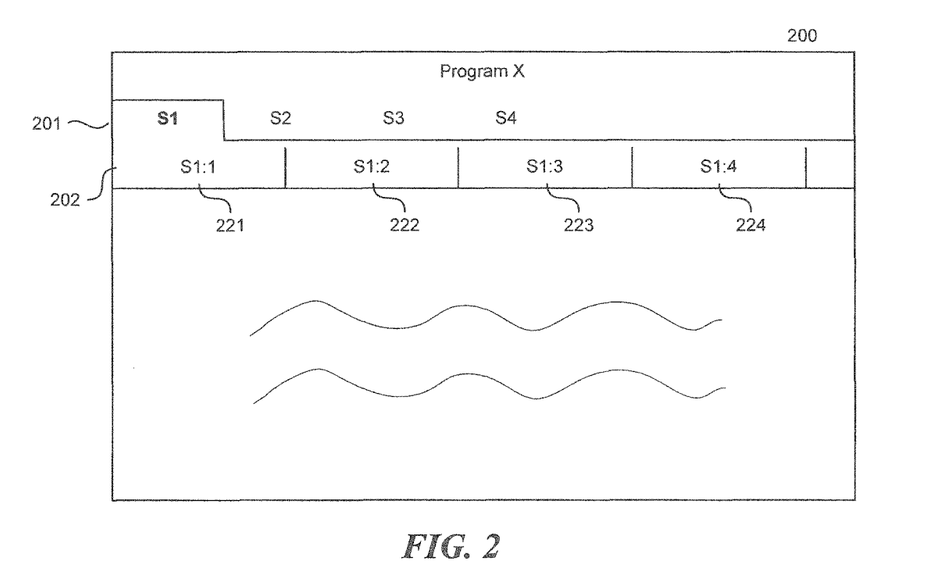
FIG. 2 is a display page that illustrates the display of subsets of commands for a selected set of commands.
Figure 3:
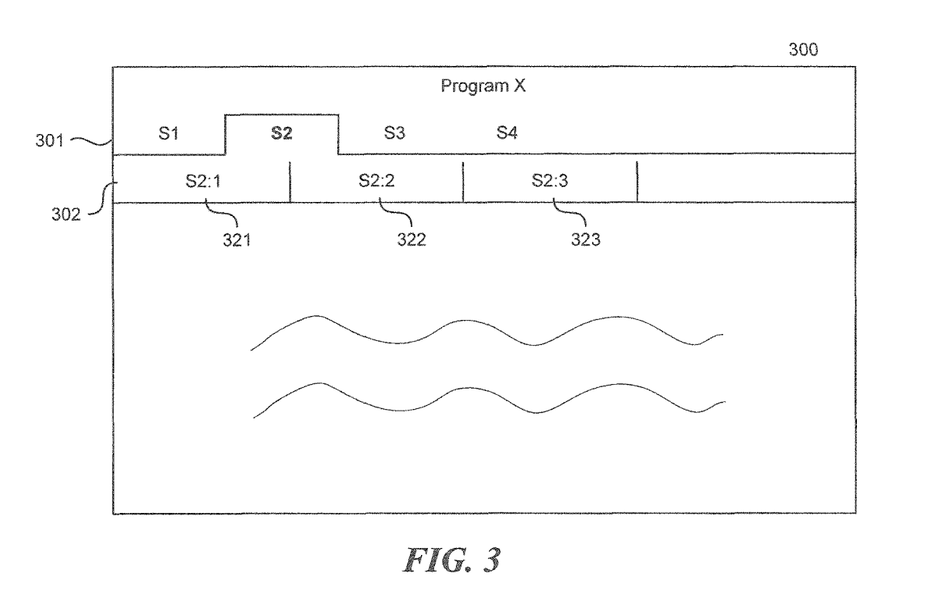
FIG. 3 is a display page that illustrates the display of the subsets of commands for a different set of commands.

FIG. 1 is a display page that illustrates a portion of a ribbon. A display page 100 includes a list 101 of the names of the sets of commands. In this example, the names for the four sets of commands are represented as S1, S2, S3, and S4. Since no name is highlighted, the application program does not display any subsets of commands. FIG. 2 is a display page that illustrates the display of subsets of commands for a selected set of commands. A display page 200 includes a list 201 of the names of the sets of commands. In response to the user selecting name S1, the application program highlights the name S1 and displays a tab box 202 with an outline of a tab around the selected name. The application program displays subsets of commands for the set of commands S1 in the tab box. The subsets of commands are identified as S1:1, S1:2, S1:3, and S1:4, and their corresponding icons are displayed in subset areas 221, 222, 223, and 224, respectively. The tab box encompasses the name S1 and the subsets of commands S1:1, S1:2, S1:3, and S1:4. A user can then select an icon representing a command to perform the function of the command. The list 201 and tab box 202 form a portion of the ribbon user interface provided by the application program. FIG. 3 is a display page that illustrates the display of the subsets of commands for a different set of commands. A display page 300 includes a list 301 of the names of the sets of commands. In response to the user selecting name S2, the application program highlights the name S2 and displays a tab box 302 with an outline of a tab around the selected name. The application program displays subsets of commands for the set of commands S2 in the tab box. The subsets of commands are identified as S2:1, S2:2, and S2:3, and their corresponding icons are displayed in subset areas 321, 322, and 323, respectively. A user can then select an icon representing a command to perform the function of the command.

SUMMARY

In some embodiments, a beak ribbon system provides a beak-based ribbon user interface with a gliding beak. The beak ribbon system displays a first identification of first commands and a second identification of second commands. The beak ribbon system then displays a beak box that has a beak pointing to the first identification and that contains the first commands. Upon receiving a selection of the second identification, the beak ribbon system glides the beak in an animated manner from pointing to the first identification to pointing to the second identification and replaces the first commands in the beak box with the second commands. The beak ribbon system may also shift the second commands in an animated manner from the first identification towards the second identification. The beak ribbon system may also expand and collapse the beak box. The beak ribbon system may expand the beak box when the first identification is selected by expanding in an animated manner the beak out of a beak line of the beak box to point to the first identification and expanding the first commands out of the beak line in the opposite direction of the expansion of the beak. The beak ribbon system may collapse the beak box when a user selects a currently selected first identification in a process that is the reverse of the expanding of the beak box.

DETAILED DESCRIPTION

A method and system for providing a beak-based ribbon user interface is disclosed. In some embodiments, a beak ribbon system provides a beak box with a beak that points to the name of a currently selected set of commands. A beak is a triangular shaped area (e.g., a caret symbol) that extends from a box pointing outward and forms part of the outline of the box, referred to as a beak box. The beak box contains the subsets of commands of a selected set of commands. A beak-based ribbon user interface may be used instead of a conventional tab-based ribbon user interface, a menu-based user interface, and so on. A beak-based ribbon user interface may provide some advantages over a tab-based ribbon user interface. These advantages may include a less cluttered user interface, animation to assist a user in remembering the location of displayed items, transitions between displayed items to avoid the distraction caused by abrupt changes in displayed items, and so on. To improve the user experience, the beak ribbon system provides a gliding beak, a shifting animation of a set of commands, a cross-fading of sets of commands, and an animated expanding and collapsing of the beak box.

In some embodiments, the beak ribbon system provides a gliding beak that glides from the set of commands to which it is currently pointed to the set of commands that is selected next. The beak ribbon system displays the names or other identification of the sets of commands. In response to a user selecting a first set of commands by selecting a first name, the beak ribbon system displays a beak box with a beak pointing to the selected name. The beak ribbon system may optionally highlight the selected name. The beak ribbon system also displays in the beak box the first set of commands. In response to the user selecting a second set of commands by selecting a second name, the beak ribbon system glides the beak from pointing to the first name to pointing to the second name. The beak ribbon system also replaces the first set of commands that are displayed in the beak box with the second set of commands. The beak ribbon system glides a beak by animating a smooth move of the beak in the direction of the newly selected name. For example, if the list of names is displayed horizontally, then the beak ribbon system may display a beak box below the list of names with the beak along the top of the box, which is referred to as the beak line. The beak ribbon system animates the moving of the beak along the beak line to point to the second name. By gliding the beak (e.g., a one-second glide), the beak ribbon system helps avoids abrupt changes in the user interface.

In some embodiments, when a new name is selected, the beak ribbon system provides shifting the new set of commands to visually indicate to the user the location of the newly selected name relative to the previously selected name. In response to a user selecting a first set of commands by selecting a first name, the beak ribbon system displays a beak box with a beak pointing to the first name. The beak ribbon system also displays in the beak box the first set of commands. In response to the user selecting a second set of commands by selecting a second name, the beak ribbon system displays the second set of commands by shifting the second set of commands from an initial position within the beak box in the direction the previously selected first name toward the newly selected second name to its final position. For example, if the first name is the leftmost name and the second name is the rightmost name in the list, then the second set of commands would shift from left to right. If a gliding beak is also used, the gliding and shifting are in the same direction. In some embodiments, the beak ribbon system may also cross-fade the first set of commands into the second set of commands. The cross-fading may occur prior to the shifting or during the shifting. The cross-fading may simultaneously fade out the first set of commands and fade in the second set of commands. The shifting and cross-fading may also be used with a tab-based ribbon user interface.

In some embodiments, the beak ribbon system provides an expanding and collapsing beak box. The beak ribbon system expands and collapses the beak box when a user alternately selects the same name of a set of commands. If no beak box is currently displayed and the user then selects a name, the beak ribbon system displays the beak box by gradually expanding the beak out of the beak line in one direction and gradually expanding (e.g., over one second) the set of commands of the selected name out of the beak line in the opposite direction. For example, if the beak box is displayed below the names, the beak ribbon system expands the beak up to the selected name and expands the beak box down from the beak line while scrolling the set of commands down out of the beak line. When the user re-selects the same name, the beak ribbon system removes the display of the beak box by gradually collapsing the beak into the beak line and gradually collapsing the set of commands that is in the beak box into the beak line. For example, if the beak box is displayed below the names, the beak ribbon system collapses the beak down to the beak line and collapses the beak box up to the beak line while scrolling the set of commands up to the beak line. The collapsing and expanding may also be used with the tab box of a tab-based ribbon user interface.

Figure 4:
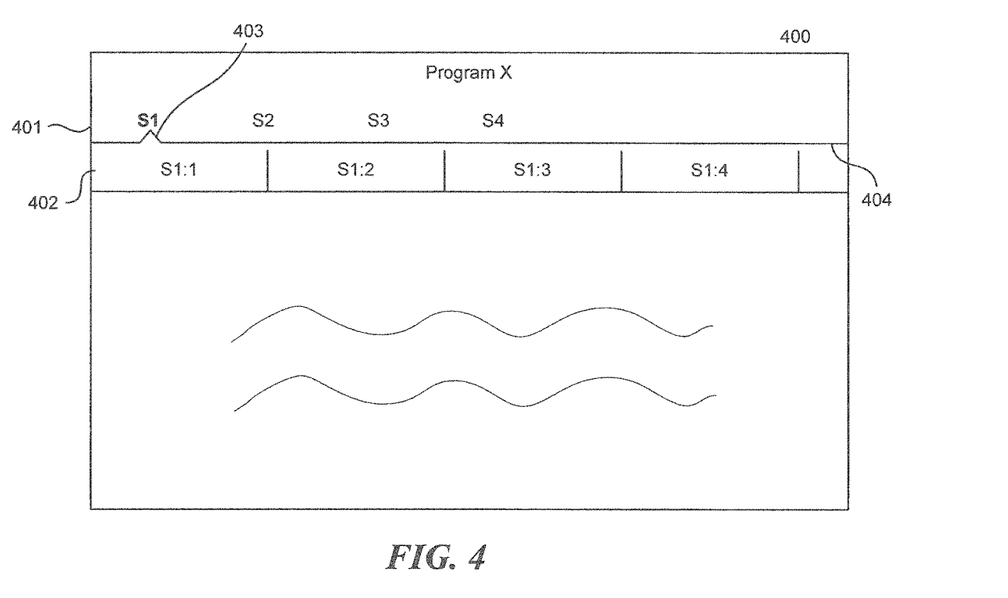
FIG. 4 is a display page that illustrates a beak box pointing to a first name of a first set of commands in some embodiments.
Figure 5:
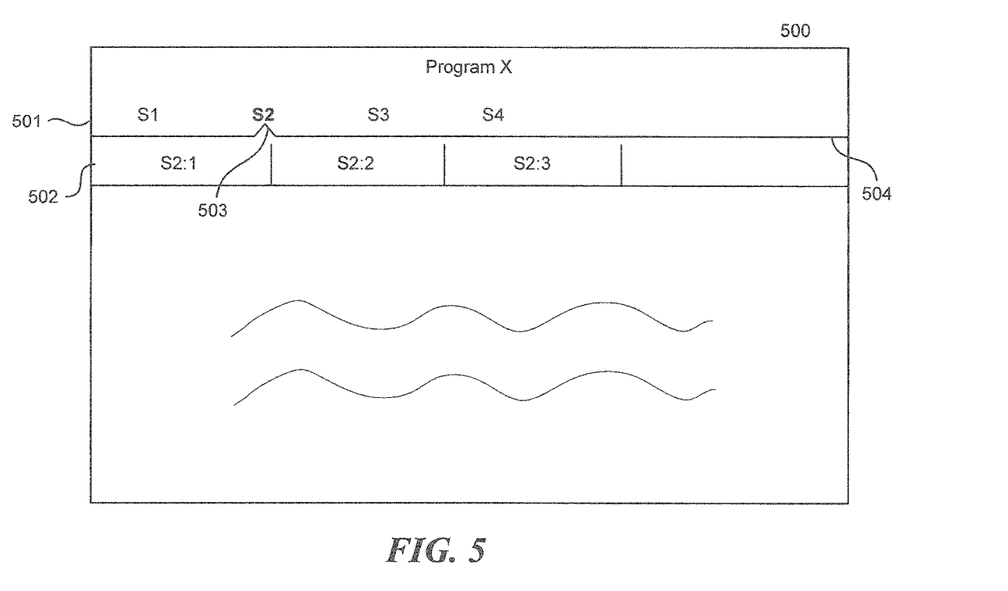
FIG. 5 is a display page that illustrates a beak box pointing to a second name of a second set of commands in some embodiments.
Figure 6:
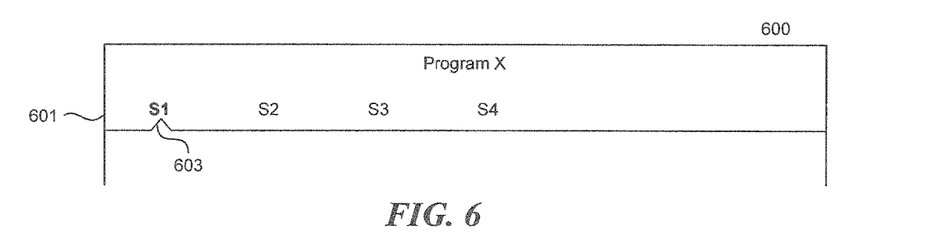
FIGS. 6-9 are portions of display pages that illustrate the gliding of a beak in some embodiments.
Figure 7:
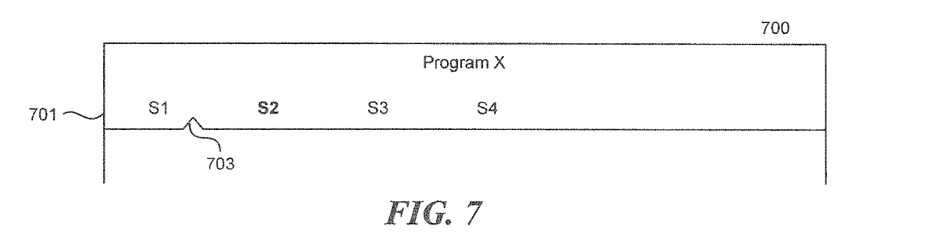
Figure 8:
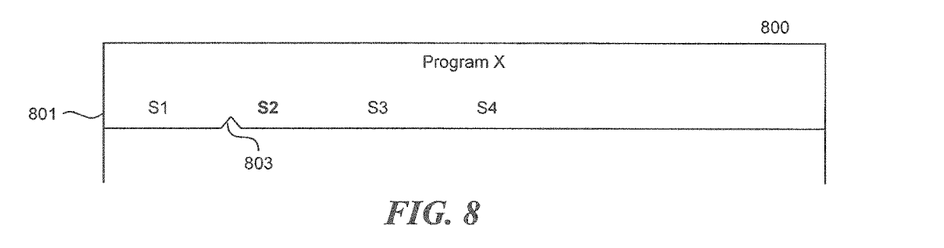
Figure 9:
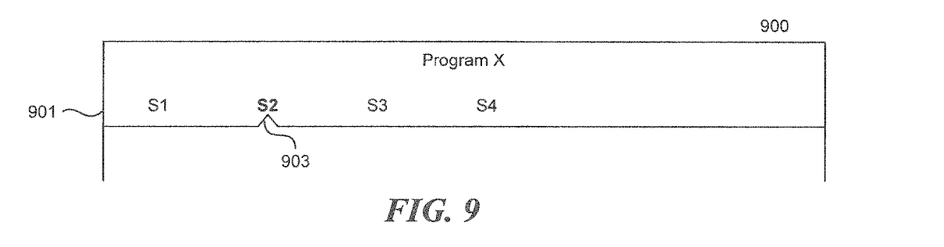

FIG. 4 is a display page that illustrates a beak box pointing to a first name of a first set of commands in some embodiments. A display page 400 includes a list 401 of names of sets of commands and a beak box 402. The beak box includes a beak line 404 with a beak 403 that points to the currently selected name S1. Inside the beak box, the beak ribbon system has displayed the set of commands for the selected name. FIG. 5 is a display page that illustrates a beak box pointing to a second name of a second set of commands in some embodiments. A display page 500 includes a list 501 of names of sets of commands and a beak box 502. The beak box includes a beak line 504 with a beak 503 that points to the currently selected name S2. Inside the beak box, the beak ribbon system has displayed the set of commands for the selected name. The beak ribbon system may have glided beak 403 from its position pointing to the name S1 to the position of beak 503 pointing to the name S2. Alternatively, the beak ribbon system may have abruptly replaced beak 403 with beak 503. The peak ribbon system also highlights the name of the currently selected set of commands.

FIGS. 6-9 are portions of display pages that illustrate the gliding of a beak in some embodiments. A display page 600 includes a list of names 601 and a beak 603 pointing to the name S1. When the user selects the name S2, the beak ribbon system highlights the name S2 and starts moving the beak from pointing to the name S1 to pointing to the name S2. Beaks 703 and 803 illustrate intermediate positions during the glide, which may be animated by displaying successive frames. Beak 903 illustrates the final position of the beak pointing to the name S2. Although not shown in these figures, the beak ribbon system also changes the content of the beak box from the set of commands of the name S1 to the set of commands of the name S2.

Figure 10:
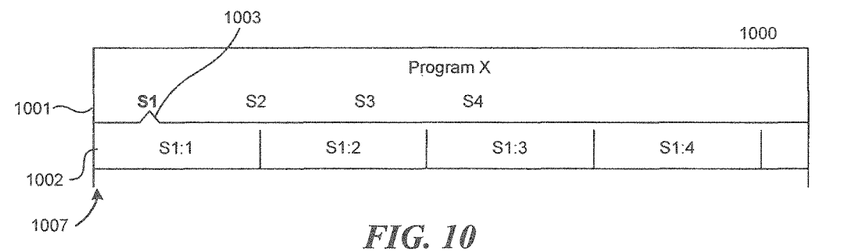
FIGS. 10-12 are display pages that illustrate the shifting and cross-fading of subsets of commands in some embodiments.
Figure 11:
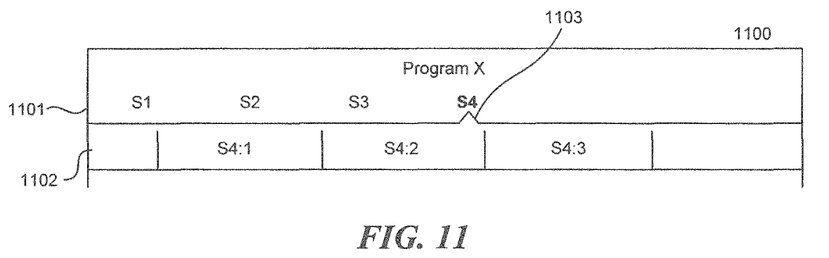
Figure 12:
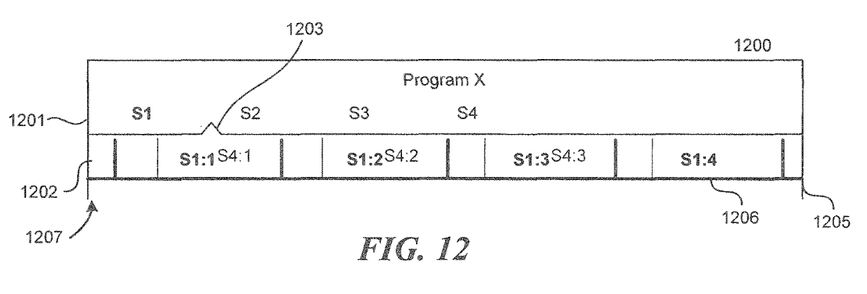

FIGS. 10-12 are display pages that illustrate the shifting and cross-fading of subsets of commands in some embodiments. A display page 1000 includes a list 1001 of names and a beak box 1002 with the name S1 currently selected. The beak box 1002 displays the set of commands associated with the name S1. A display page 1100 includes a list 1101 of names and a beak box 1102. The beak box 1102 displays the set of commands associated with the name S4. When the name S4 is currently selected and the user then selects the name S1, the beak ribbon system starts the shifting and cross-fading of the sets of commands. A display page 1200 includes a list 1201 of names and beak box 1202 with a beak 1203 in an intermediate position on its way over to point to the name S1. Beak box 1202 shows the cross-fading of the set of commands of the name S4 into the set of commands of the name S1. The thickness of the lines and the set of commands in beak box 1202 is to help illustrate the cross-fading. The set of commands of the name S4 started off at an initial position aligned with the right line 1205 of the beak box and have been shifted to the left an intermediate amount in the direction of the name S1 to an intermediate position at line 1206. As the beak glides to point to the name S1, the set of commands arrives at its final position aligned with the left line 1207 resulting in what is shown in FIG. 10. In some embodiments, the cross-fading completes as the set of commands reaches its final position or may complete prior to reaching its final position.

Figure 13:
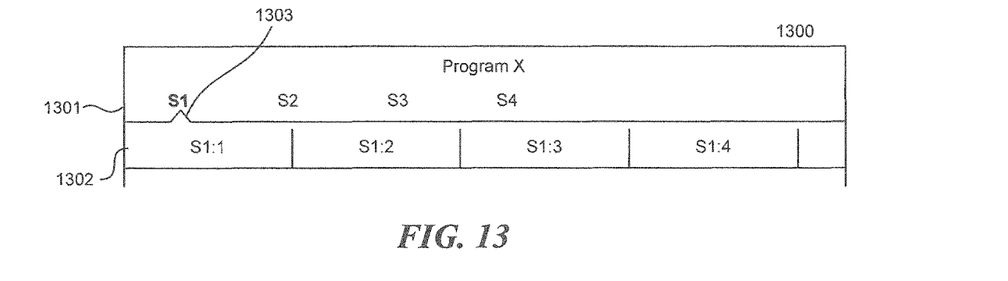
FIGS. 13-15 are display pages illustrating the expanding and collapsing of a beak box in some embodiments.
Figure 14:
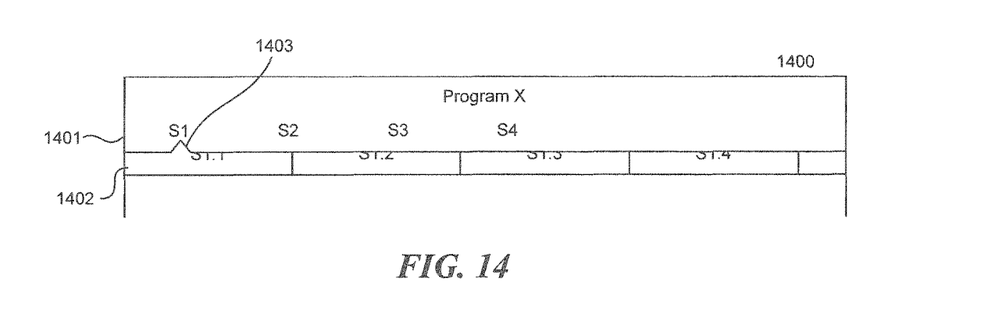
Figure 15:
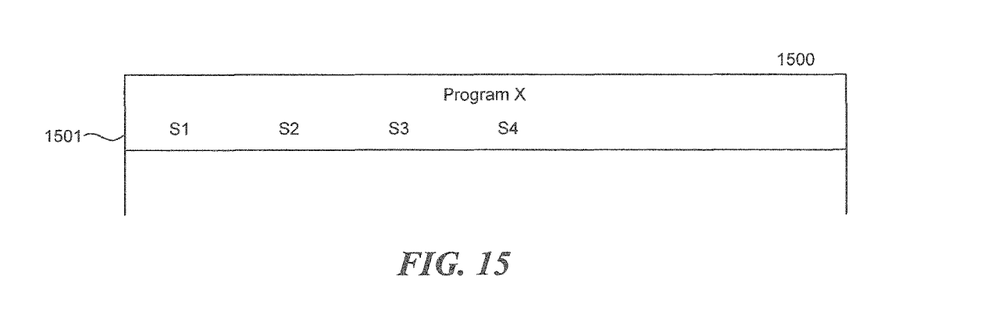

FIGS. 13-15 are display pages illustrating the expanding and collapsing of a beak box in some embodiments. A display page 1300 illustrates a fully expanded beak box and includes a list 1301 of names and a beak box 1302 with the name S1 currently selected. When a user again selects the currently selected name (e.g., S1), the beak ribbon system starts to collapse the beak box. A display page 1400 illustrates a partially collapsed beak box and includes a list 1401 of names and a beak box 1402 that is collapsing. The beak ribbon system collapses the beak box by collapsing the beak 1403 into the beak line 1405 and moving the opposite line 1406 to the beak line 1405 while scrolling the set of the commands that is displayed within the beak box. The beak box 1402 illustrates that the set of commands of beak box 1302 have scrolled up approximately halfway towards the beak line. A display page 1500 illustrates a fully collapsed beak box. If a user selects a name when no beak box is displayed, the beak ribbon system expands the beak box in a reverse process by expanding the beak to point to the selected name, expanding the beak box out from the beak line, and scrolling the set of commands out from the beak line. The expanding of the beak box after a user selects the name S1 of FIG. 15 would result in the intermediate display of the display page 1400 and the final display of the display page 1300.

Figure 16:
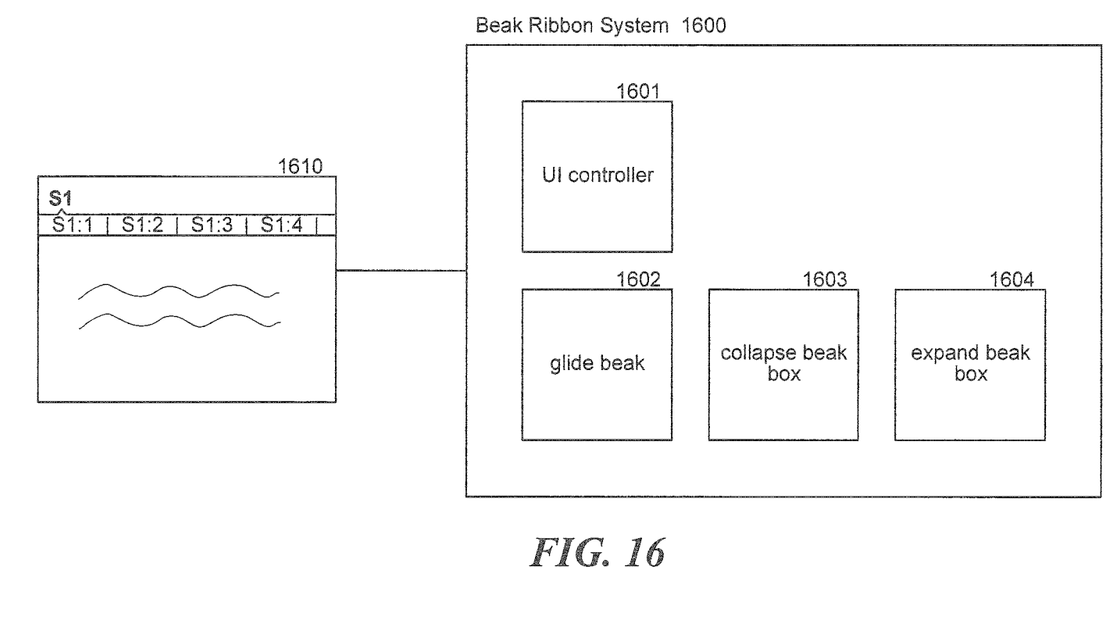
FIG. 16 is a block diagram that illustrates components of the beak ribbon system in some embodiments.

FIG. 16 is a block diagram that illustrates components of the beak ribbon system in some embodiments. A beak ribbon system 1600 includes a user interface controller component 1601, a glide beak component 1602, a collapse beak box component 1603, and an expand beak box component 1604. The beak ribbon system may be used as the user interface for any type of application program. The user interface controller component interacts with a display 1610 and input mechanisms (e.g. touchscreen, mouse, and keyboard), which are not illustrated, to display the names of the sets of commands and the commands in a currently selected set using a beak-based ribbon. When a beak box is currently being displayed for a selected name and the user selects another name, the glide beak component is invoked to glide the beak, with optional shifting and cross-fading. The collapse beak box component and the expand beak box component are invoked to collapse and expand the beak box.

The computing devices and systems on which the beak ribbon system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing devices may include desktop computers, laptops, tablets, e-readers, personal digital assistants, smartphones, gaming devices, servers, and computer systems such as massively parallel systems. The computing devices may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and include other storage means. The computer-readable storage media may have recorded upon or may be encoded with computer-executable instructions or logic that implements the beak ribbon system. The data transmission media is used for transmitting data via transitory, propagating signals or carrier waves (e.g., electromagnetism) via a wired or wireless connection.

The beak ribbon system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the beak ribbon system may be implemented in hardware using, for example, an application-specific integrated circuit ("ASIC").

Figure 17:
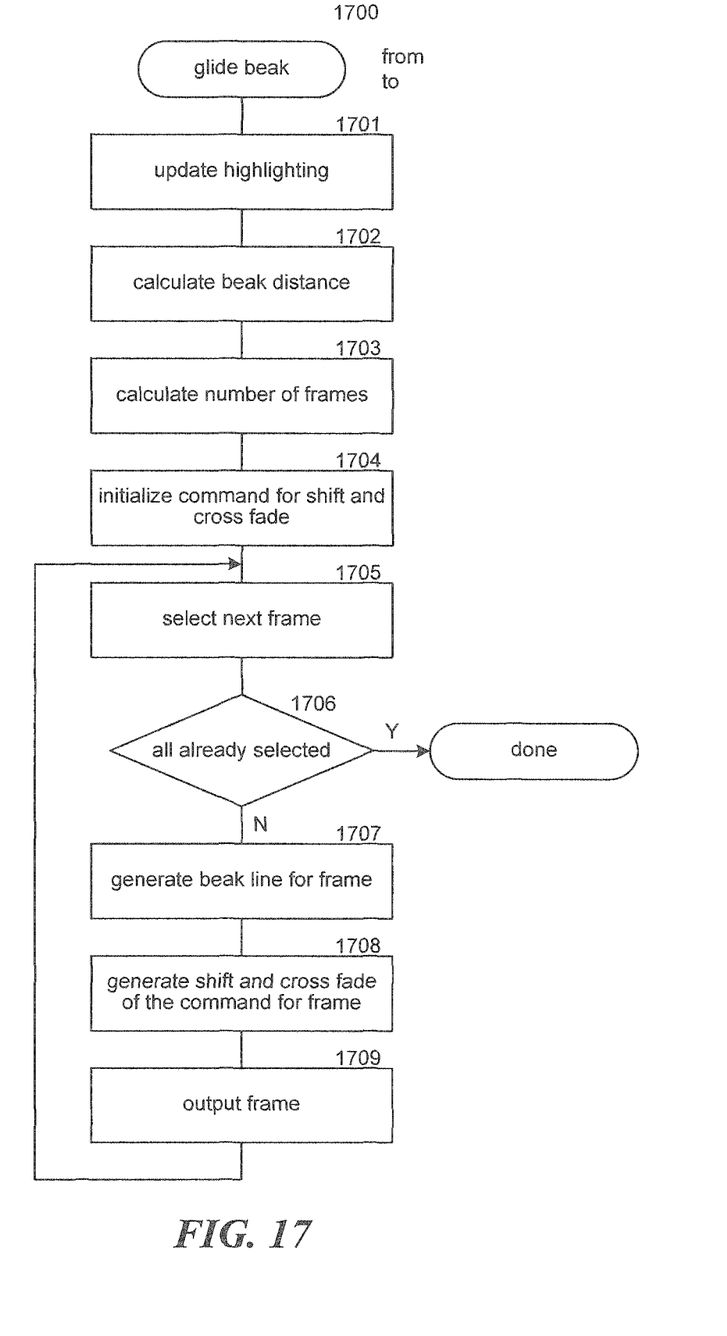
FIG. 17 is a flow diagram that illustrates the processing of the glide beak component in some embodiments.

FIG. 17 is a flow diagram that illustrates the processing of the glide beak component in some embodiments. A glide beak component 1700 is passed an indication of a from-name and a to-name and effects the gliding of the beak and shifting of the commands to the to-name. In block 1701, the component updates the highlighting of the names by removing the highlighting from the from-name and adding highlighting to the to-name. In block 1702, the component calculates a beak travel distance based on the location of the from-name and the to-name on the display. In block 1703, the component calculates the number of display frames over which the glide is to occur. The component effects the gliding of the beak by an animation of beak movement over multiple frames that may be displayed at constant intervals based on the desired glide speed. In block 1704, the component initializes the commands for the shift and cross fade. The initialization includes the determining of the initial position for the set of commands of the to-name. In blocks 1705-1709, the component loops, gliding the beak and shifting and cross-fading the commands. In block 1705, the component selects the next frame. In decision block 1706, if all the frames have already been selected, then the component completes, else the component continues at block 1707. In block 1707, the component generates a beak line for the frame with the beak shifted from its last location towards the to-name. In block 1708, the component generates the shift and cross-fade of the commands for the frame. In block 1709, the component outputs the frame and then loops to block 1705 to create the next frame.

Figure 18:
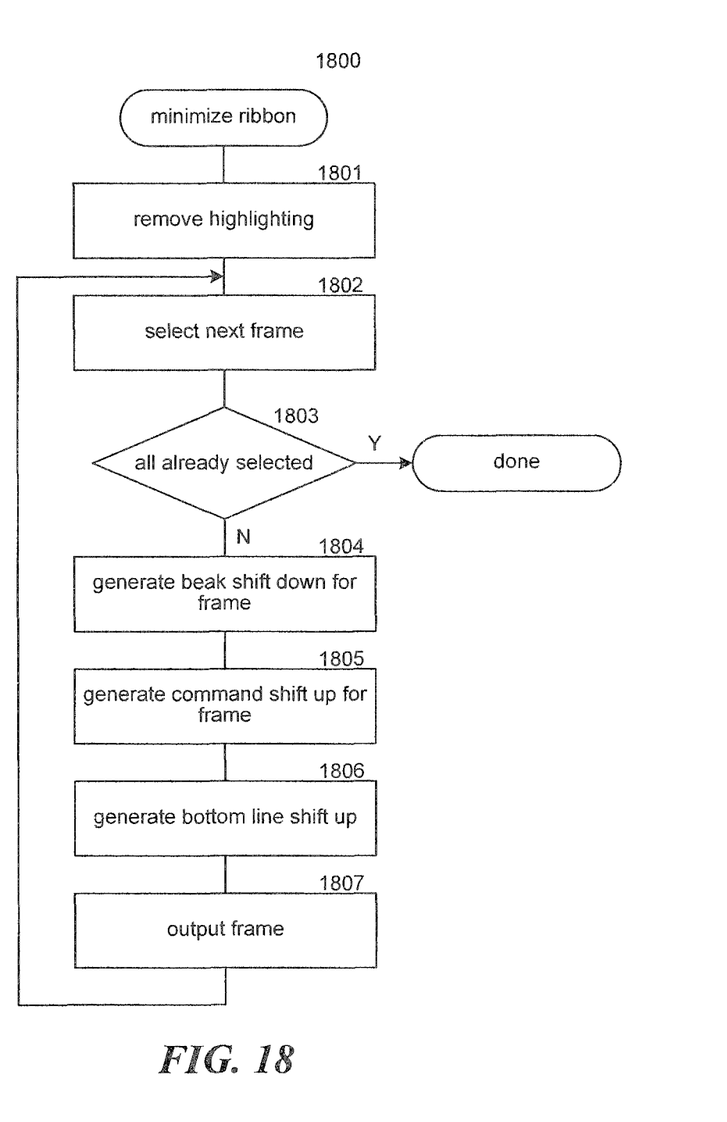
FIG. 18 is a flow diagram that illustrates the collapse ribbon component of the beak ribbon system in some embodiments.

FIG. 18 is a flow diagram that illustrates the collapse ribbon component of the beak ribbon system in some embodiments. A collapse ribbon 1800 component collapses the beak box into the beak line. In block 1801, the component removes highlighting from the currently selected name. In blocks 1802-1807, the component loops, generating frames to animate the collapsing of the beak. In block 1802, the component selects the next frame. In decision block 1803, if all the frames have already been selected, then the component completes, else the component continues at block 1804. In block 1804, the component generates a shift down of the beak towards the beak line for the frame. In block 1805, the component generates a shift up of the set of commands for the frame. In block 1806, the component generates the shift up of the opposite line. In block 1807, the component outputs the frame and then loops to block 1802 to select the next frame.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. For example, the list of names may be displayed vertically and the beak box may be displayed to the left or right of the list. Also, the list of names may be left-aligned, center-aligned, or right-aligned when displayed horizontally. As another example, different timings may be user for the beak gliding, command shifting, and command cross-fading. In some embodiments, the cross-fading may begin at the same time for the previous commands and the new commands with the fade out of the previous commands starting quickly and slowing down as it progresses and with the fade in of the new commands starting slowly and speeding up as it progresses. Also, with a beak box, the timing of the gliding, shifting, and cross-fading may be around 0.25 seconds with a shift of around eight pixels, which can vary based on characteristics of the display device. With a tab box, the shifting and cross-fading may be around 0.13 seconds with a shift of around four pixels. Accordingly, the invention is not limited except as by the appended claims.

The invention claimed is:

1. A computer-readable storage medium storing computer-executable instructions for controlling a computing device to display commands, the computer-executable instructions comprising instructions that:
display a first identification of first commands and a second identification of second commands;
display a beak box that has a beak pointing to the first identification and that contains the first commands;
receive a selection of the second identification;
upon receiving the selection of the second identification,
glide the beak from pointing to the first identification to pointing to the second identification wherein the gliding of the beak moves the beak in an even and uninterrupted way; and
replace the first commands in the beak box with the second commands by shifting the second commands from the first identification towards the second identification such that the shifting and gliding overlap in time.

2. The computer-readable storage medium of claim 1 wherein the instructions that replace the first commands with the second commands further cross-fade the first commands into the second commands.

3. The computer-readable storage medium of claim 2 wherein the first commands are cross-faded into the second commands prior to the shifting.

4. The computer-readable storage medium of claim 2 wherein the first commands are cross-faded into the second commands during the shifting.

5. The computer-readable storage medium of claim 2 wherein the cross-fading simultaneously fades out the first commands and fades in the second commands.

6. The computer-readable storage medium of claim 1 wherein the computer-executable instructions further include instructions that:
upon receiving a second selection of the second identification, collapse the beak box by collapsing the beak into a beak line of the beak box and scrolling the displayed second commands into the beak line.

7. The computer-readable storage medium of claim 6 wherein the computer-executable instructions further include instructions that:
upon receiving a third selection of the second identification, expand the beak box by expanding the beak out of the beak line of the beak box and scrolling the second commands out of the beak line.

8. The computer-readable storage medium of claim 6 wherein the collapsing of the beak box is gradual.

9. The computer-readable storage medium of claim 1 wherein the computer-executable instructions that glide the beak move the beak in a smooth way.

10. The computer-readable storage medium of claim 1 wherein the computer-executable instructions that glide the beak animate a smooth move of the beak.

11. The computer-readable storage medium of claim 1 wherein the computer-executable instructions that glide the beak animate a smooth move of the beak in a direction of the second identification.

12. The computer-readable storage medium of claim 1 wherein the beak is triangular-shaped.

13. A method performed by a computing system to display commands, the method comprising:
displaying a first identification of first commands and a second identification of second commands;
displaying a beak box that has a beak pointing to the first identification and that contains the first commands;
receiving a selection of the second identification;
upon receiving the selection of the second identification,
gliding the beak from pointing to the first identification to pointing to the second identification wherein the gliding of the beak moves in a smooth way; and
replacing the first commands in the beak box with the second commands including shifting the second commands from the first identification towards the second identification such that the shifting and gliding overlap in time.

14. The method of claim 13 wherein the replacing of the first commands with the second commands cross-fades the first commands into the second commands.

15. The method of claim 14 wherein the first commands are cross-faded into the second commands prior to the shifting.

16. The method of claim 14 wherein the first commands are cross-faded into the second commands during the shifting.

17. The method of claim 14 wherein the cross-fading simultaneously fades out the first commands and fades in the second commands.

18. The method of claim 13 wherein the beak is triangular-shaped.

19. The method of claim 13 further comprising, upon receiving a second selection of the second identification, collapsing the beak box by collapsing the beak into a beak line of the beak box and scrolling the displayed second commands into the beak line.

20. The method of claim 19 wherein the collapsing of the beak box is gradual.

21. The method of claim 19 further comprising, upon receiving a third selection of the second identification, expanding the beak box by expanding the beak out of the beak line of the beak box and scrolling the second commands out of the beak line.

22. The method of claim 21 wherein the expanding of the beak box is gradual.

* * * * *